US012116977B2

(12) United States Patent
Yambeh Yambaha et al.

(10) Patent No.: US 12,116,977 B2
(45) Date of Patent: Oct. 15, 2024

(54) ASSEMBLING OR DISASSEMBLING A GEAR ASSEMBLY OF A WIND TURBINE

(71) Applicant: Vestas Wind Systems A/S, Aarhus N (DK)

(72) Inventors: Noel Yambeh Yambaha, Berlin (DE); Xose Lubian Berreco, Brión (ES)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/768,333

(22) PCT Filed: Oct. 2, 2020

(86) PCT No.: PCT/DK2020/050267
§ 371 (c)(1),
(2) Date: Apr. 12, 2022

(87) PCT Pub. No.: WO2021/078341
PCT Pub. Date: Apr. 29, 2021

(65) Prior Publication Data
US 2024/0263615 A1  Aug. 8, 2024

(30) Foreign Application Priority Data
Oct. 23, 2019 (DK) .......................... PA 2019 70660

(51) Int. Cl.
*F03D 13/10* (2016.01)
*F03D 15/10* (2016.01)
(Continued)

(52) U.S. Cl.
CPC ........... *F03D 13/122* (2023.08); *F03D 15/10* (2016.05); *F05B 2230/60* (2013.01);
(Continued)

(58) Field of Classification Search
CPC ...... F03D 13/10; F03D 13/122; F03D 13/139; F03D 15/00; F03D 15/10; F03D 15/101;
(Continued)

(56) References Cited

U.S. PATENT DOCUMENTS

2010/0009799 A1\*  1/2010  Ciszak .................... F16C 35/06
                                                        475/159
2013/0036609 A1\*  2/2013  Frisch .................... F03D 15/00
                                                        29/893.1
(Continued)

FOREIGN PATENT DOCUMENTS

CN  103711656 A      4/2014
CN  105697738 A  \*  6/2016
(Continued)

OTHER PUBLICATIONS

Japanese Patent Office, Notice of Reasons for Refusal issued in corresponding JP Application No. 2022-523873 dated Feb. 16, 2024 with English translation.
(Continued)

*Primary Examiner* — Mark A Laurenzi
*Assistant Examiner* — Xiaoting Hu
(74) *Attorney, Agent, or Firm* — Wood Herron & Evans LLP

(57) ABSTRACT

A method of assembling or disassembling a gear assembly (20) of a wind turbine (10), the gear assembly (20) comprising a first helical gear (28) and a second helical gear (24) configured for rotatable engagement with the first helical gear (28), the method comprising transmitting a control signal to cause: axial movement of the first helical gear (28) at an axial speed relative to the second helical gear (24) along a rotational axis of the first helical gear (28): and, rotational movement of the first helical gear (28) at a first rotation speed relative to the second helical gear (24) about
(Continued)

the rotational axis of the first helical gear (28), wherein one of the axial speed and the first rotation speed is a predetermined speed, and the other of the axial speed and first rotation speed is determined in dependence on the predetermined speed, and wherein the control signal causes the axial and rotational movement of the first helical gear (28) to occur simultaneously to engage or disengage the first and second helical gears (28, 24).

15 Claims, 8 Drawing Sheets

(51) Int. Cl.
*F16H 57/00* (2012.01)
*F16H 57/02* (2012.01)
*F16H 57/023* (2012.01)

(52) U.S. Cl.
CPC ....... *F05B 2230/61* (2013.01); *F05B 2230/70* (2013.01); *F05B 2250/25* (2013.01); *F05B 2260/40311* (2013.01); *F16H 2057/0062* (2013.01); *F16H 2057/02078* (2013.01); *F16H 57/023* (2013.01)

(58) Field of Classification Search
CPC ............ F05B 2230/60; F05B 2230/601; F05B 2230/604; F05B 2230/606; F05B 2230/608; F05B 2230/61; F05B 2230/70; F05B 2260/4031; F05B 2260/40311; F05B 2250/25; F16H 2057/0062; F16H 2057/02078; F16H 2057/0235; F16H 57/023
See application file for complete search history.

(56) References Cited

U.S. PATENT DOCUMENTS

| 2013/0178326 A1* | 7/2013 | Franke | F16H 57/082 29/893 |
| 2019/0277393 A1* | 9/2019 | Hasan | F03D 80/50 |

FOREIGN PATENT DOCUMENTS

| DE | 102004004351 A1 | 8/2005 | |
| DE | 102019106597 A1 * | 9/2020 | |
| EP | 1677032 A1 * | 7/2006 | ............. F03D 1/003 |
| EP | 2146090 A2 * | 1/2010 | ........... B66C 23/207 |
| FR | 3052212 A1 * | 12/2017 | ............... F16H 1/28 |
| GB | 2136084 A | 9/1984 | |
| JP | 2000337245 A | 12/2000 | |
| JP | 2001200898 A | 7/2001 | |
| JP | 2007525623 A | 9/2007 | |
| SU | 976154 A1 | 11/1982 | |
| WO | 2010005790 A2 | 1/2010 | |
| WO | 2020043249 A1 | 3/2020 | |

OTHER PUBLICATIONS

Danish Patent and Trademark Office, Search and Examination Report in PA 2019 70660, Apr. 23, 2020.

European Patent Office, International Search Report and Written Opinion in PCT Application No. PCT/DK2020/050267, Dec. 10, 2020.

Brazilian Patent Office, Opinion and Search Report issued in corresponding BR Application No. 112022007517-0, dated Apr. 15, 2024 (with English translation).

* cited by examiner

ASSEMBLING OR DISASSEMBLING A GEAR ASSEMBLY OF A WIND TURBINE

TECHNICAL FIELD

The invention relates generally to the assembly or disassembly of a gear assembly of a wind turbine and, in particular, to the assembly or disassembly of a gear assembly having helical gears.

BACKGROUND

Wind turbines for power generation are well known in the art. The size and scale of wind turbines is becoming ever larger to increase their power generating capacity. A typical wind turbine has a tower supporting a nacelle, a rotor hub and a plurality of rotor blades connected to the rotor hub.

Many wind turbines include a gearbox including a gear assembly housed in the nacelle. In particular, the gear assembly is located between the rotor hub and a generator of the wind turbine, and the gear assembly acts to step up the relatively low rotational speed of a main shaft connected to the rotor and rotor blades to the relatively high rotational speed of a generator shaft connected to the generator.

The gear assembly of a wind turbine typically includes several component parts. For instance, the gear assembly may include one or more planetary gear arrangements each including a sun gear, a plurality of planet gears and a ring gear, where the gears are helical gears configured for rotatable engagement with one another.

The gear assembly may need to be assembled or disassembled 'up-tower', i.e. when the gear assembly is in position in the nacelle at the top of the wind turbine tower. For instance, the components of the gear assembly may need to be engaged or disengaged from one another to perform maintenance of the gear assembly or other part of the wind turbine, or to replace certain components of the gear assembly.

By removing certain gear components without removing the entire gearbox assembly from the nacelle, smaller cranes to perform the removal may be used which in turn may reduce the cost of performing maintenance. However, disengaging certain gear components, e.g. helical gears, from each other requires precision to prevent damage being caused to the components. For instance, it can be difficult to remove one helical gear from another without rotating one of the gears. Such precise control of relatively large, heavy components up-tower in a wind turbine necessitates manual control of the gear by a skilled operator using a crane and/or tool which is merely designed to support the weight of the gear. In order to prevent damage being caused to the gear, such manual operations typically involve the operator making small alternating rotational and translational adjustments to the gear until the gears are separated from each other, which can be time consuming.

Known methods and tools for assembling or disassembling a gear assembly up-tower a wind turbine do not provide the necessary precision, accuracy and degree of control.

It is against this background to which the present invention is set.

SUMMARY OF THE INVENTION

According to a first aspect of the invention, there is provided a method of assembling or disassembling a gear assembly of a wind turbine, the gear assembly comprising a first helical gear and a second helical gear configured for rotatable engagement with the first helical gear, the method comprising transmitting a control signal to cause: axial movement of the first helical gear at an axial speed relative to the second helical gear along a rotational axis of the first helical gear; and, rotational movement of the first helical gear at a first rotation speed relative to the second helical gear about the rotational axis of the first helical gear, wherein one of the axial speed and the first rotation speed is a predetermined speed, and the other of the axial speed and first rotation speed is determined in dependence on the predetermined speed, and wherein the control signal causes the axial and rotational movement of the first helical gear to occur simultaneously to engage or disengage the first and second helical gears.

The rotational speed and the axial speed can be controlled to cause the respective axial and rotational movements of the first helical gear to occur simultaneously to either engage or disengage the first and second helical gears in a smooth, fast and controlled manner. This is in contrast to known methods of assembling or disassembling gear assemblies which require the rotational and axial movements to be performed in separate, consecutive stages.

The control signal may be transmitted to first and second actuators configured to cause the respective axial and rotational movement of the first helical gear in dependence on the control signal. The control signal may control the actuators according to a pre-defined assembly of disassembly strategy. Each actuator may comprise a step motor, for example, a brushless DC electric motor, that divides a full rotation into a number of equal steps, which enables the speed and relative position of the first helical gear, in both the rotational and axial directions, to be controlled to a high degree of accuracy.

The first rotation speed may be determined in dependence on a geometrical parameter of the first and/or second helical gears. Such geometrical parameters define the helix angles of the helical gears, and thereby enable the axial and rotational movements of the first helical gear to be controlled so as to avoid contacting the second helical gear during the assembling or disassembling of the gear assembly. The geometrical parameter may comprise at least one of: a tooth width; a helix angle; a tilt angle; and, a pitch diameter.

The control signal may cause the axial and rotational movements of the first helical gear to commence at substantially the same time. The respective actuators may be controlled to cause instantaneous and simultaneous movement of the first helical gear in both the axial and rotational directions.

The method may comprise: providing a lifting tool arranged to engage with the gear assembly and to be controlled to cause the axial and rotational movement of the first helical gear; and, transmitting a control signal to cause adjustment of a tilt angle of the lifting tool relative to the second helical gear prior to the axial and rotational movement of the first helical gear. Controlling the tilt angle of the lifting tool, and therefore the gear assembly, conveniently aligns the first and second helical gears during the assembling or disassembling process, which thereby prevents damage to the helical features of the gear assembly.

The method may comprise, when assembling the gear assembly, aligning a groove of the first helical gear with a tooth of the second helical gear prior to the axial and rotational movement of the first helical gear relative to the second helical gear. Alternatively, a groove of the second helical gear may be aligned with a tooth of the second helical gear. This initial misalignment of the helix patterns of the first and second helical gear prevents the teeth of the respective helical patterns from abutting each other, thereby preventing the teeth from being damaged during the assembly process.

The gear assembly may comprise a third helical gear and a fourth helical gear configured for rotatable engagement with the third helical gear, wherein the method comprises transmitting the control signal to cause: axial movement of the third helical gear at an axial speed relative to the fourth helical gear along a rotational axis of the third helical gear; and, rotational movement of the third helical gear at a third rotation speed relative to the fourth helical gear about a rotational axis of the third helical gear, the third rotation speed being determined in dependence on the predetermined speed, and the third rotation speed being different from the first rotation speed, wherein the control signal causes the axial and rotational movement of the third helical gear to occur simultaneously with the axial and rotational movement of the first helical gear to engage or disengage the third and fourth helical gears.

Advantageously, the method provides a smooth engagement and/or disengagement of two gear sets within the same gear assembly. In particular, the rotational speeds of first helical gear and the third helical gear (i.e. the first and second rotational speeds) and the axial speed can be controlled, independently of each other, so as to provide a simultaneous assembling or disassembling of the gear assembly.

In alternative exemplary arrangements of the gear assembly, the first and third helical gears may be arranged such that they can be translated at different axial speeds. Accordingly, it will be appreciated that the axial speed of the first helical gear, with respect to the second helical gear, may be different to the axial speed of the third helical gear as defined with respect to the fourth helical gear.

The gear assembly may comprise a planet carrier supporting the first helical gear and being coupled to the third helical gear, wherein the method comprises transmitting the control signal to cause rotational movement of the planet carrier to cause the rotational movement of the third helical gear about its rotational axis. According to this exemplary arrangement, the third and first helical gears are arranged together as a single removable portion of the gear assembly such that the axial speed of the third helical gear is the same as the axial speed of first helical gear.

According to a yet further aspect of the invention, there is provided a controller for assembling or disassembling a gear assembly of a wind turbine, the gear assembly comprising a first helical gear and a second helical gear configured for rotatable engagement with the first helical gear, the controller being configured to: receive data indicative of one of an axial speed of the first helical gear relative to the second helical gear along a rotational axis of the first helical gear and a first rotation speed of the first helical gear relative to the second helical gear; determine the other of the axial speed and the first rotation speed in dependence on the received data; and, transmit a control signal to cause axial movement of the first helical gear at the axial speed along a rotational axis of the first helical gear, and to cause rotational movement of the first helical gear at the first rotation speed relative to the second helical gear about the rotational axis of the first helical gear, wherein the control signal is configured to cause the axial and rotational movement of the first helical gear to occur simultaneously to engage or disengage the first and second helical gears.

According to a still further aspect of the invention, there is provided a lifting tool for assembling or dissembling a gear assembly of a wind turbine, the gear assembly comprising a first helical gear and a second helical gear configured for rotatable engagement with the first helical gear, the lifting tool comprising: a support frame having a support arm and engagement means configured for engagement with the gear assembly; a guide assembly arranged to be mounted to a housing of the gear assembly and for engagement with the support arm; a first actuator arranged to cause axial movement of the support frame guided by the guide assembly; and a second actuator arranged to cause rotational movement of the engagement means relative to the support arm; wherein, when the engagement means is in engagement with the gear assembly, the first actuator is controllable to cause the axial movement of the support frame and the first helical gear at an axial speed relative to the second helical gear along a rotational axis of the first helical gear and the second actuator is controllable to cause the rotational movement of the engagement means and the first helical gear at a first rotation speed relative to the second helical gear about the rotational axis of the first helical gear, wherein one of the axial speed and the first rotation speed is a predetermined speed, and the other of the axial speed and first rotation speed is determined in dependence on the predetermined speed, and wherein the first and second actuators are controllable to cause the respective axial and rotational movements to occur simultaneously to engage or disengage the first and second helical gears.

The gear assembly may comprise a third helical gear and a fourth helical gear configured for rotatable engagement with the third helical gear, wherein: the engagement means comprises a first helical gear engaging portion arranged to engage with the first helical gear and a third helical gear engaging portion arranged to engage with third helical gear of the gear assembly, the second actuator being arranged to cause rotational movement of the first helical gear engaging portion, and the lifting tool comprising a third actuator arranged to cause rotational movement of the third helical gear engaging portion; wherein the third actuator is controllable to cause the rotational movement of the third helical gear at a third rotation speed relative to the fourth helical gear about a rotational axis of the third helical gear, the third rotation speed being determined in dependence on the predetermined speed, and wherein the third actuator is controllable to operate simultaneously with the first and second actuators to engage or disengage the third and fourth helical gears.

The first helical gear may be a planet gear of a first gear set of the gear assembly, the second helical gear is a ring gear of the first gear set, the third helical gear is a sun gear of a second gear set of the gear assembly, and the fourth helical gear is a planet gear of the second gear set, the gear assembly comprising a planet carrier supporting the planet gear of the first gear set and being coupled to the sun gear of the second gear set; wherein the first helical gear engaging portion comprises a dummy sun gear arranged to engage with the planet gear of the first gear set, and the third helical gear engaging portion is configured to rotatably engage the planet carrier to cause the rotational movement of the sun gear of the second gear set.

The lifting tool may comprise coupling means attached to the support frame for coupling the lifting tool to a crane for moving the lifting tool into position, wherein the coupling means comprises an attachment member arranged for attachment to the support frame and arranged to allow movement of the support frame relative to the coupling means, and the lifting tool comprising a fourth actuator arranged to cause movement of the support frame relative to the coupling means along a longitudinal axis of the support frame to adjust a tilt angle of the lifting tool.

According to a yet further aspect of the invention, there is provided a wind turbine including a gear assembly having a first helical gear and a second helical gear configured for rotatable engagement with the first helical gear; a lifting tool according to any of preceding paragraphs for assembling or dissembling the gear assembly; and, a crane for moving the lifting tool into position relative to the gear assembly.

It will be appreciated that the foregoing represents only some of the possibilities with respect to the particular subsystems of a lifting tool controller which may be included, as well as the arrangement of those subsystems with the controller. Accordingly, it will be further appreciated that embodiments of a lifting tool control system which include other or additional subsystems and subsystem arrangements remain within the scope of the present invention. Additional sub-systems may include, for example, systems relating to the operation of a wind turbine generator.

The set of instructions (or method steps) described above may be embedded in a computer-readable storage medium (e.g. a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

BRIEF DESCRIPTION OF THE DRAWINGS

Examples of the invention will now be described with reference to the accompanying drawings, in which.

DETAILED DESCRIPTION

Figure 1:
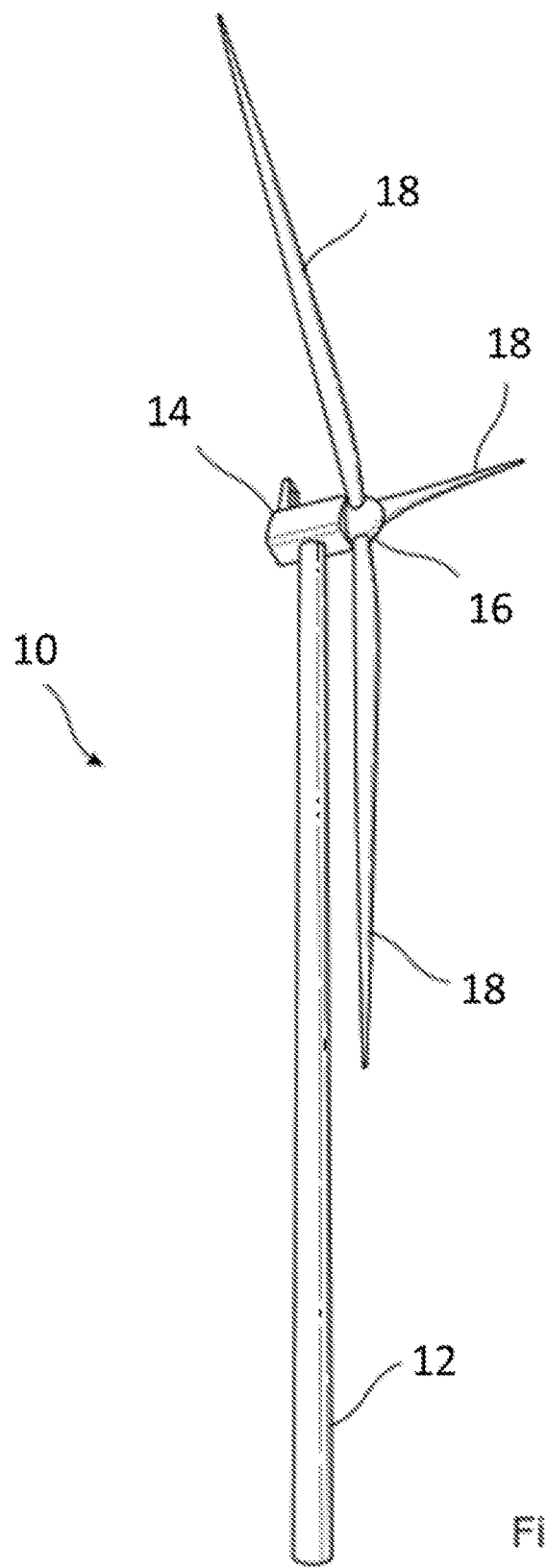
FIG. 1 illustrates a wind turbine including a nacelle and a plurality of rotor blades.

FIG. 1 shows a wind turbine 10 including a tower 12, a nacelle 14 rotatably coupled to the top of the tower 12, a rotor including a rotor hub 16 mounted to the nacelle 14, and a plurality of wind turbine rotor blades 18—in the described example, three rotor blades—which are coupled to the rotor hub 16. The nacelle 14 and rotor blades 18 are turned and directed into the wind direction by a yaw system. The nacelle 14 houses generating components (not shown) of the wind turbine 10, including a generator, gearbox, drivetrain and brake assembly, as well as convertor equipment for converting the kinetic energy of the wind into electrical energy for provision to the grid. The wind turbine 10 is shown in its fully-installed form suitable for operation; in particular, the rotor hub 16 is mounted on the nacelle 14 and each of the blades 18 are mounted on the rotor hub 16.

Figure 2:
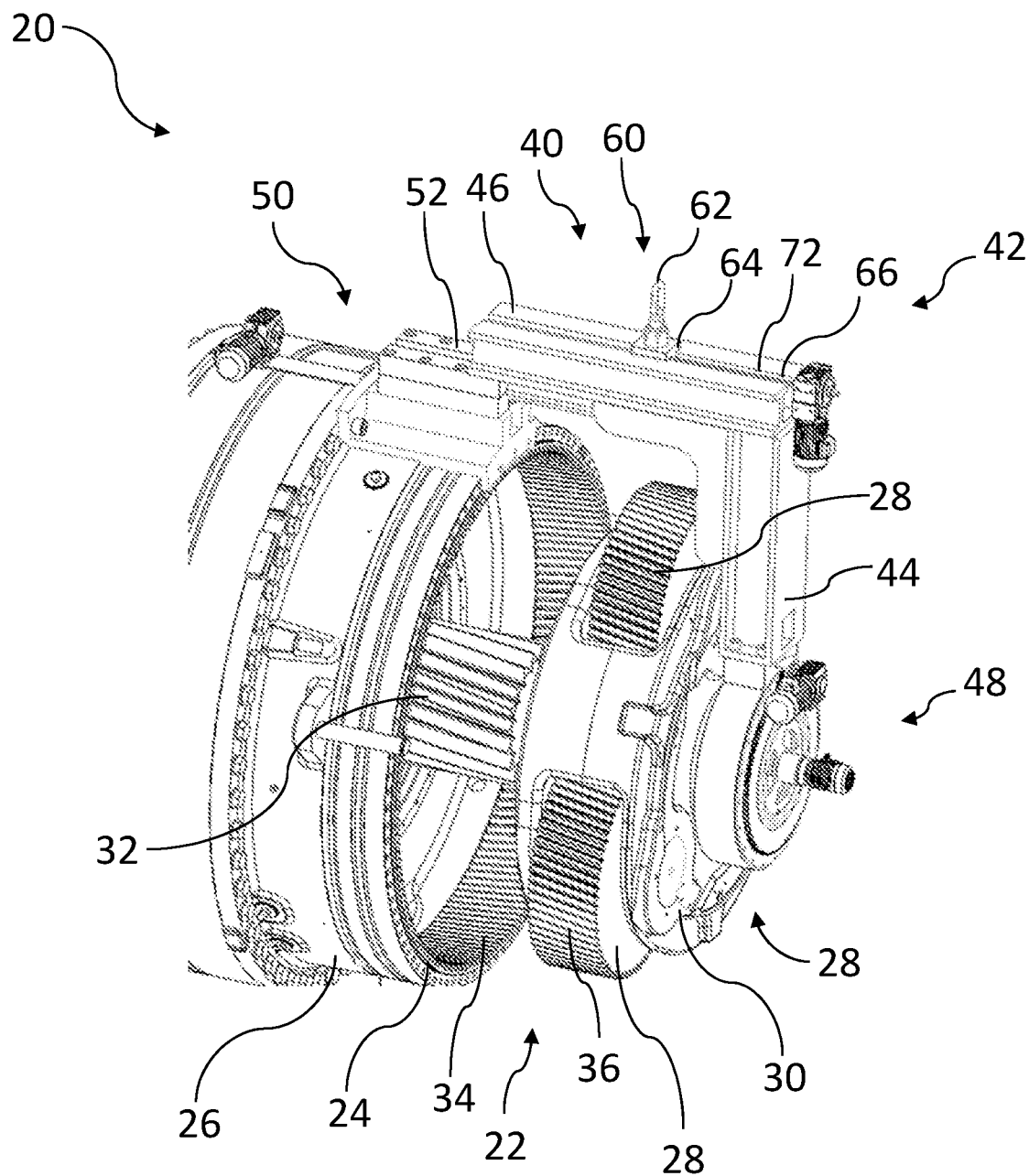
FIG. 2 illustrates a gear assembly housed in the nacelle of FIG. 1, and a lifting tool mounted to a removable part of the gear assembly, the gear assembly being in a disassembled configuration.

FIG. 2 illustrates a gear assembly 20 of the wind turbine 10, the gear assembly being housed in the nacelle 14. In particular, the gear assembly 20 is a subassembly of a planetary gearbox and, specifically, the gear assembly 20 includes two planetary gear sets. A first one of the gear sets 22 includes a ring gear 24 defined by a housing 26 of the gear assembly 20, a plurality of—in this example, three—planet gears 28 for engaging with the ring gear 24, a planet carrier 30—also referred to as a planetary gear carrier—that supports or carries the planet gears 28, and a sun gear (not shown) to be housed within the planet carrier 30 and for engagement with the planet gears 28. In FIG. 2, the planet gears 28 and planet carrier 30 are disengaged from the ring gear 24.

A second one of the gear sets includes a sun gear 32 coupled to the planet carrier 30 of the first gear set 22. In FIG. 2, the sun gear 32 is disengaged from the rest of the second gear set (not shown), which is within the housing 26. In particular, the sun gear 32 is for engaging with a plurality of planet gears of the second gear set.

Figure 3A:
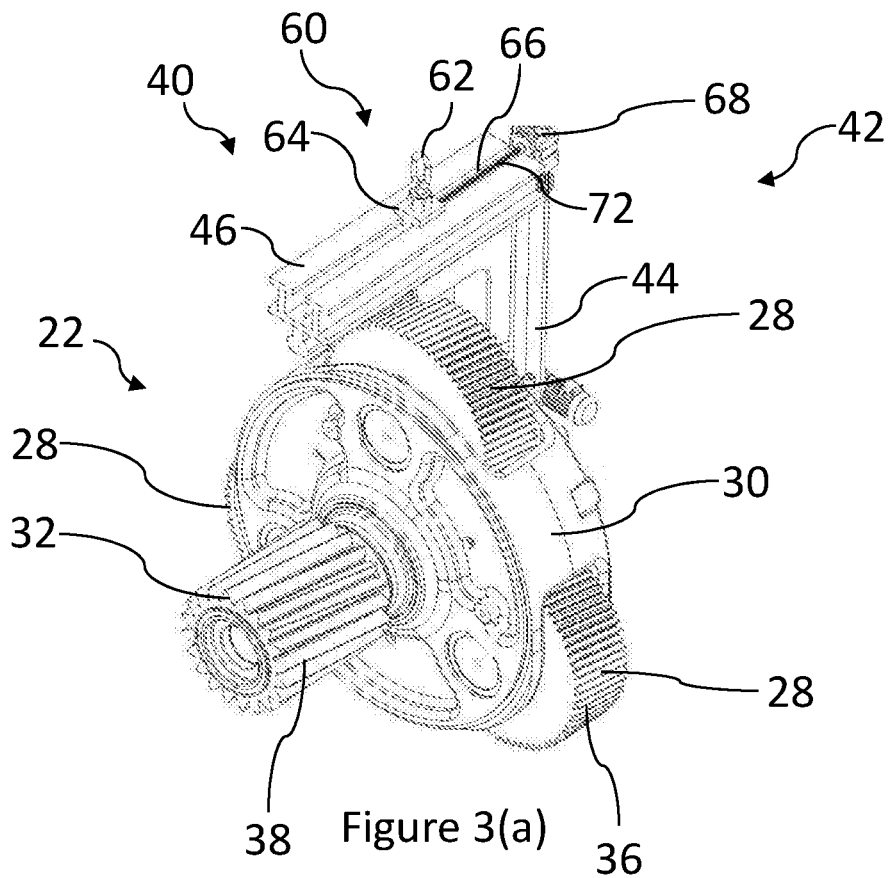
FIGS. 3(a) and 3(b) illustrate perspective and side views, respectively, of the lifting tool of FIG. 2 mounted to the removable part of the gear assembly and isolated from the remainder of the gear assembly.
Figure 3B:
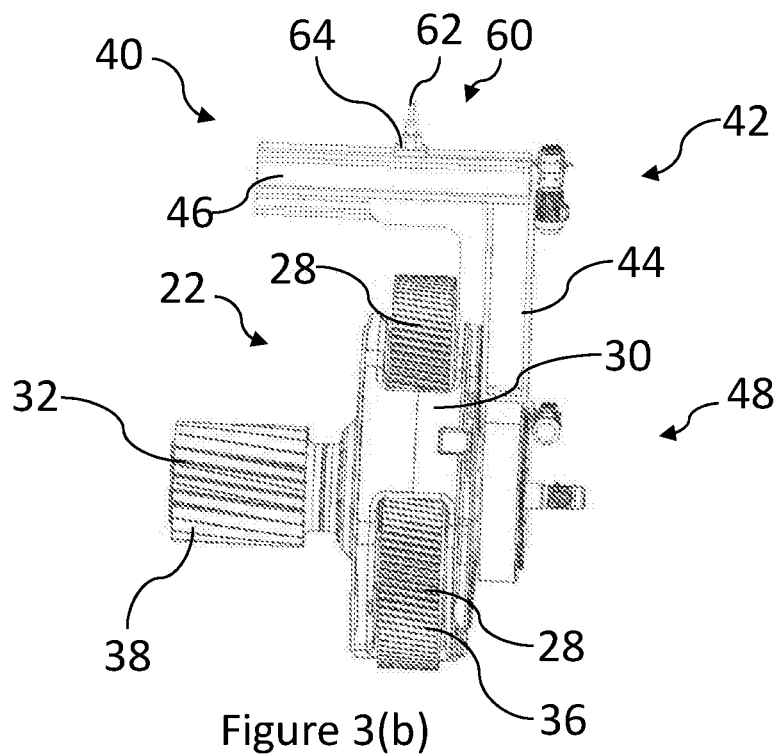
Figure 4A:
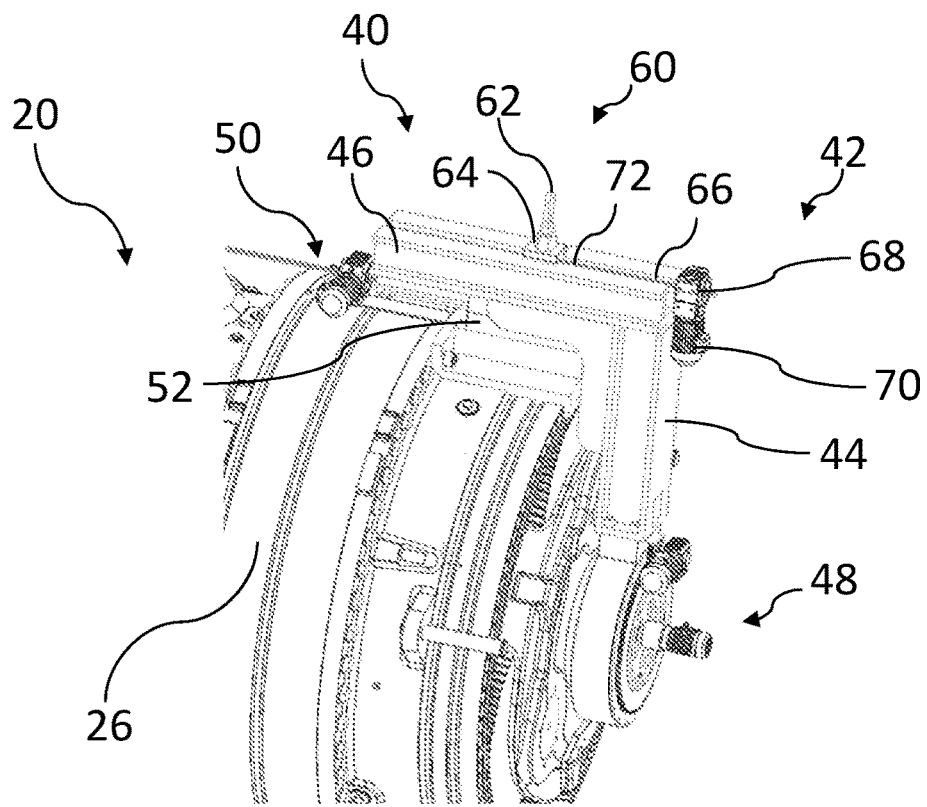
FIGS. 4(a) and 4(b) illustrate perspective and side views, respectively, of the gear assembly and lifting tool of FIG. 2 when the gear assembly is in an assembled configuration.
Figure 4B:
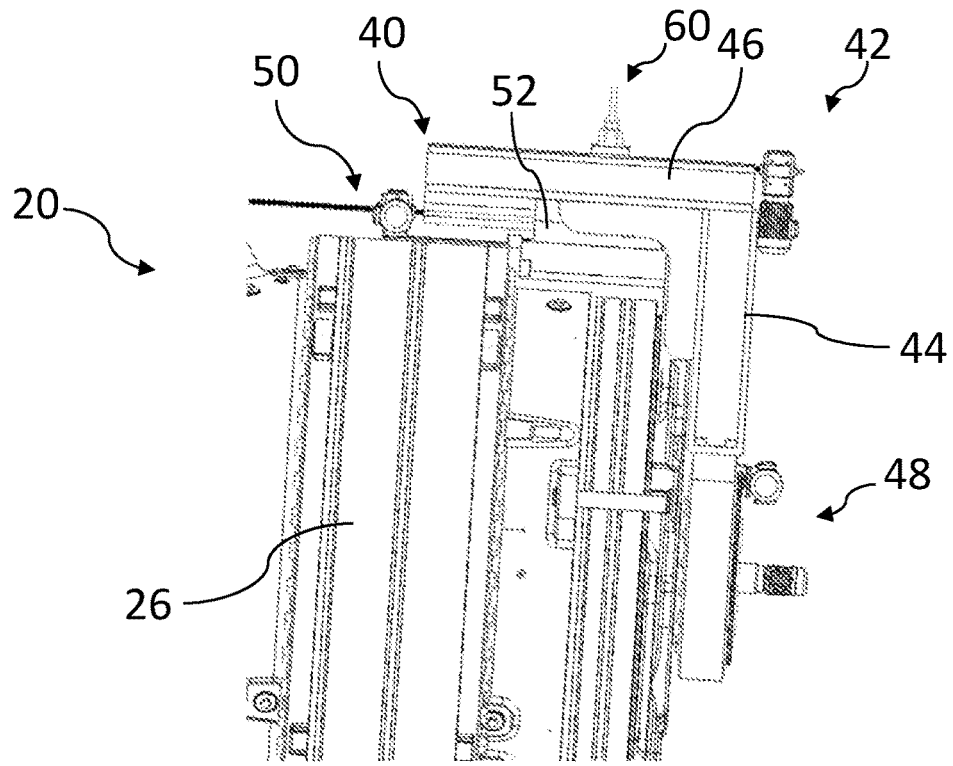

The configuration of the planet gears 28 and planet carrier 30 of the first gear set 22, and the sun gear 32 of the second gear set, is illustrated in FIGS. 3(a) and 3(b), showing the gears in isolation from the rest of the gear assembly 20. In FIGS. 4(a) and 4(b) the gear assembly 20 is shown in an assembled configuration in which the plurality of planet gears 28 is engaged with the corresponding ring gear 24 of the first gear set 22, and the sun gear 32 is engaged with the plurality of planet gears of the second gear set.

The gears 24, 28, 32 of the first and second gear sets are in the form of helical gears, i.e. each of the gears comprise a course of engaging teeth and grooves that define a helix angle. The helix angle of each gear is at least partially defined by the 'value' and the 'direction' of the helix angle.

The helix angle value is measured between a tangent to the longitudinal direction of the helix (i.e. one of the teeth or grooves of the helix gear) and the rotational axis of the gear. The direction of the helix angle is defined by whether the helix angle is cut with a right-hand or a left-hand orientation. The helix angles of those gears that engage, or mesh, with one another are arranged to 'correspond' to each other. That is, the engaging gears have the same helix angle value but have an opposing helix angle direction, for instance if two external gears engage, whereas they have a same helix angle direction, for instance if an internal and an external gear engage.

FIGS. 2, 3(a) and 3(b) illustrate that the helix angle direction of the helix angle 34 of the ring gear 24 is equal to the helix angle direction of the helix angles 36 of the planet gears 28 and each of these helix angles 34, 36 have the same angle value. In this way, the helix angle 34 of the ring gear 24 corresponds to the helix angle 36 of the planet gears 28 so that the planet gears 28—also referred to as first gears 28—may rotatably engage with the ring gear 24—also referred to as the second gear 24.

The sun gear (not shown) of the first gear set 22, has a helix angle direction, which is opposite to the direction of the helix angle 34 of the ring gear and helix angle 36 of the planet gears 28. The helix angle 34 of the ring gear 24 and the helix angles 36 of the planet gear 28 are defined as having a right-hand orientation. The helix angles of the planet, ring and sun gears of the first gear set 22, all have the same helix angle value which in an exemplary embodiment is 8 degrees. It will be appreciated, that the helical gears may comprise a different helix angle according to different exemplary arrangements of the invention.

Similarly, in the second gear set, the helix angle 38 of the sun gear 32 corresponds to the helix angles of the planet gears (not shown) so that the sun gear 32—also referred to as a third gear 32—may rotatably engage with the planet gears of the second gear set—also referred to as fourth gears. Accordingly, the direction of the helix angle 38 of the sun gear 32 is opposite to the helix angle direction of the planet gears, but they are each configured with the same helix angle value.

Furthermore, the helix angles 34, 36 of the ring and planet gears 24, 28 of the first gear set 22 are different to the helix angle 38 of the sun gear 32 of the second gear set. However, it will be appreciated that the helical gears of the first and second gear sets may be configured with corresponding helix angles, without departing from the scope of the invention.

According to the exemplary arrangement described herein, the helical gears 24, 28 of the first gear set 22 are arranged with a pitch diameter and tooth/groove width which is different to that of the helical gears 32 of the second gear set. However, it will be appreciated that the helical gears of the first and second gear sets may be configured with substantially the same pitch diameter and tooth/groove widths, without departing from the scope of the invention.

Figure 5:
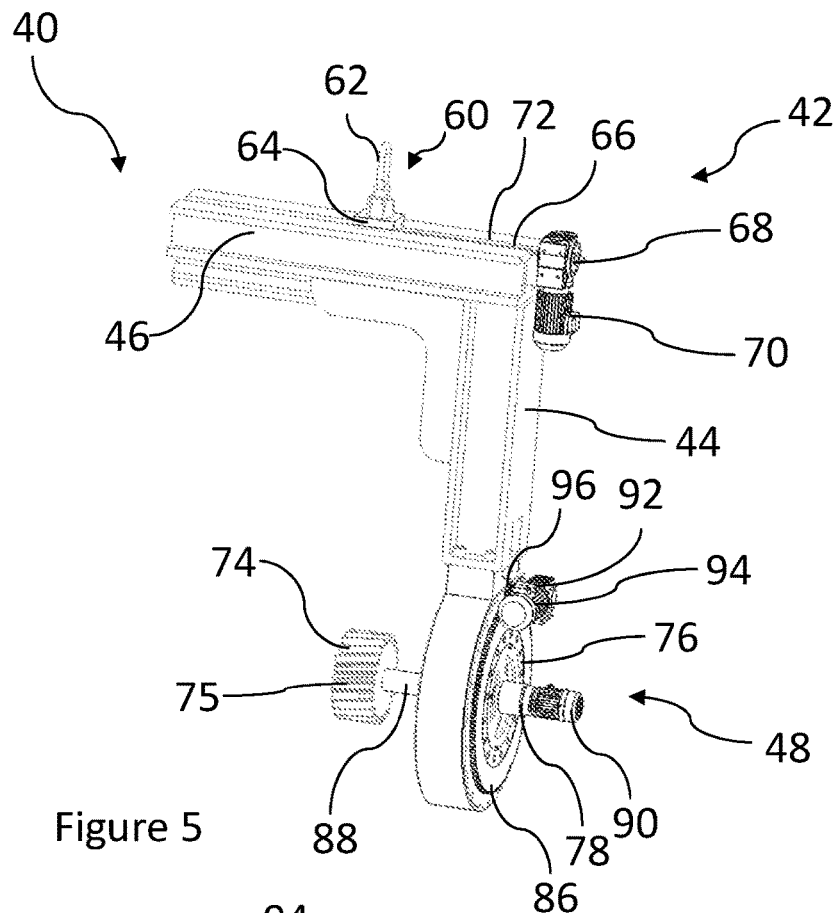
FIG. 5 illustrates part of the lifting tool of FIG. 2 and, in particular, illustrates a support arm and an engagement portion of the lifting tool.

With continuing reference to FIGS. 2, 3(a), 3(b), 4(a) and 4(b)—and additional reference to FIG. 5—a lifting tool 40 is provided for assembling or disassembling the gear assembly 20. That is, the lifting tool 40 is for moving at least a portion of the gear assembly 20 from a disengaged configuration (as shown in FIG. 2) to an engaged configuration (as shown in FIGS. 4(a) and 4(b)), or vice versa.

The lifting tool 40 includes a support frame 42 having a vertical arm 44 and a horizontal arm 46, the vertical arm 44 being connected at its upper end to the horizontal arm 46. The vertical arm 44 of the support frame 42 is connected or attached at its lower end to an engagement portion 48 of the support frame 42, where the engagement portion 48 is for engaging with the gear assembly 20.

Figure 7:
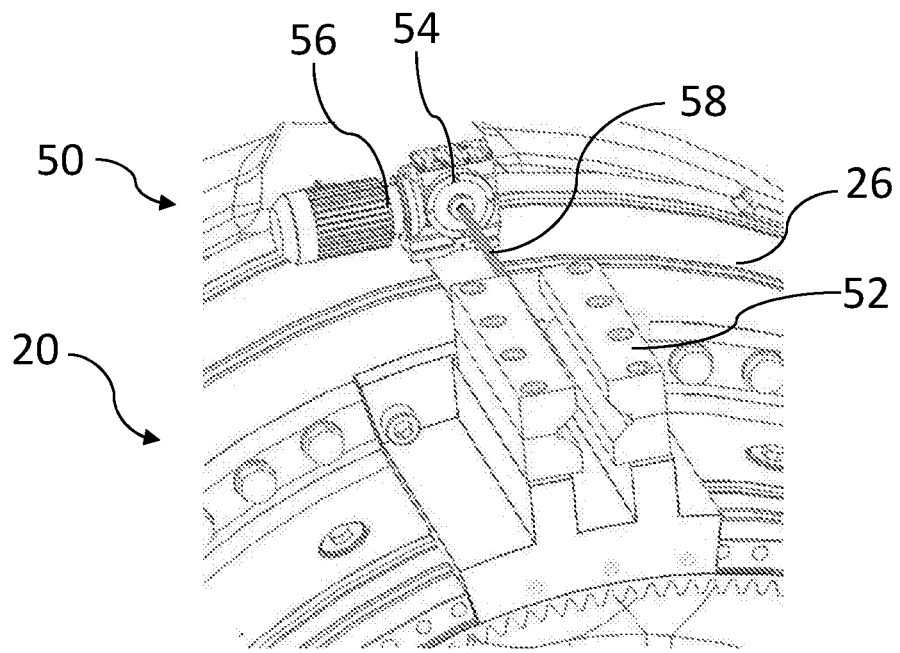
FIG. 7 illustrates a perspective view of part of the lifting tool of FIG. 2 that is mounted to the gear assembly.

With particular reference to the FIGS. 2, 4(a) and 4(b)—and additional reference to FIG. 7—the lifting tool 40 includes a guide assembly 50 mounted to the housing 26 of the gear assembly 20. The guide assembly 50 has a guide component 52 for coupling with the support frame 42. In particular, the guide component 52 forms a slot through which part of the support frame 42 may be received to permit relative slidable movement between the support arm 42 and the guide component 52 in an axial direction of the gear assembly 20, i.e. substantially parallel to an axis of rotation of one or more of the gears 24, 28, 32.

The lifting tool 40 includes an axial actuator 54—also referred to as a first actuator 54—for causing the axial movement of the support frame 42 relative to the guide component 52 and housing 26 of the gear assembly 20. In the described example, the axial actuator 54 includes a rotatable motor 56 coupled to a rod 58. The rod 58 is connected to the support frame 42, and rotation of the motor 56 causes translational movement of the rod which in turn causes the support frame 42 to move. The rod 58 extends through the slot of the guide component 52 to maintain the direction of movement of the rod 58 and therefore the support frame 42.

As illustrated in FIGS. 2, 3(a), 3(b), 4(a), 4(b), and FIG. 8, the lifting tool 40 includes a coupling arrangement 60 for coupling the lifting tool 40 to a crane (not shown) for moving the lifting tool 40 into position relative to the gear assembly 20 including the housing 26. For instance, the guide assembly 50 of the lifting tool 40 may first be mounted to the gear assembly housing 26, and then the rest of the lifting tool 40 may be hoisted into position by the crane, in particular to bring the support arm 42 into slidable attachment with the guide component 52.

Figure 8:
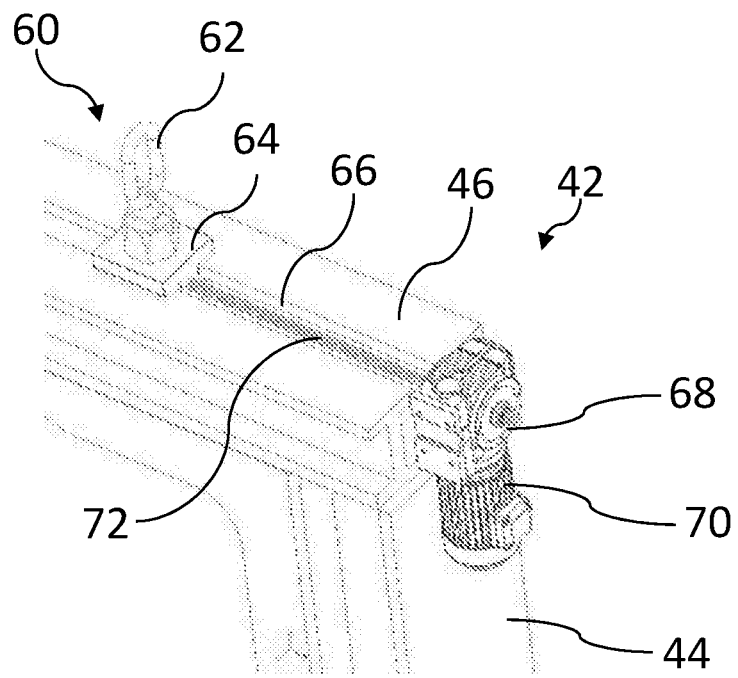
FIG. 8 illustrates a coupling member of the lifting tool of FIG. 2 for coupling the lifting tool to a crane.

With particular reference to FIG. 8, the coupling arrangement 60 includes a coupling ring 62 for receiving, and engaging with, a hook of the crane. The coupling arrangement 60 also includes an attachment member or adjustable yoke 64 connected to the coupling ring 62 and slidably coupled to the horizontal arm 46 of the support frame 42. In particular, the attachment member 64 is received into a slot 66 of the horizontal arm 46 that extends along the length of the horizontal arm 46. This permits relative movement between the coupling arrangement 60 and the support frame 42 substantially in the axial direction of the gear assembly 20. Specifically, the support frame 42 may be moved relative to the coupling arrangement 60 to adjust a tilt angle of the support frame 42 and engagement portion 48. This may be used to ensure that the engagement portion 48 of the lifting tool 40 is tilted by an appropriate amount to correspond to a tilt angle of the gear assembly 20. The tilt angle of the support frame 42 refers to the angle by which the longitudinal axis of the horizontal arm 46 is deviated from the horizontal. Similarly, the tilt angle of the gear assembly 20 defines the angle by which the rotational axis of the first helical gear 28 deviates from the horizontal.

Controlling the tilt angle of the gear assembly 20 ensures that the first and second helical gears 28, 24 are axially aligned prior to their assembling or disassembling, so as to prevent damage to the helical features of the gears. For example, the ring gear 24 of the first gear set 22 is mounted within the housing 26 such that its rotational axis is upwardly angled by 6 degrees. Therefore, the leading end of the planet gear 28 must be downwardly tilted by 6 degrees in order to engage with the ring gear 24.

The lifting tool 40 further comprises a tilt angle actuator 68 for causing the movement of the support frame 42 relative to the coupling arrangement 60. Similarly to the axial actuator 54, in the described example the tilt angle actuator 68 includes a rotatable motor 70 coupled to a rod 72. The rod 72 is connected to the adjustable yoke 64, and rotation of the motor 70 causes translational movement of the rod 72 which in turn causes the support frame 42 to move. The rod 72 extends through the slot 66 of the horizontal member 46 to maintain the orientation and position of the rod 72.

The tilt angle is affected by the orientation of the suspended mass (i.e. the combined mass of the gear assembly 20 and the support frame 42) with respect to the coupling arrangement 60. Moving the coupling arrangement 60 relative to the support frame 42 causes it to rotate about the attachment member 64, which thereby alters the tilt angle of the gear assembly 20.

The mass of the suspended portion of the gear assembly is supported by the crane throughout. At times during the assembly or disassembly of the gear arrangement 20, the combined centre of gravity of the gear assembly 20 and the lifting tool 40 is caused to shift along the longitudinal direction of the horizontal arm of the support frame 42 (i.e. in parallel with the rotational axes of the gears of the gear assembly). For example, at certain times during the assembling of the gear assembly 20, the leading end of the suspended gear assembly will be caused to rise-up, thereby altering the tilt angle, as the support arm 42 is tilted about the coupling arrangement 60.

To counteract this tilting movement, the tilt angle actuator 68 is controlled to translate the attachment member 64 towards the trailing end of the horizontal arm 46 (i.e. towards the tilt angle actuator 68), so as to maintain the tilt angle of the gear assembly 20. The tilt angle actuator 68 may also be controlled to adjust the configuration of the coupling arrangement 60 during disassembly of the gear assembly 20, by moving the attachment member 64 towards the leading end of the horizontal arm 46 (i.e. away from the actuator 68) as the suspended portion of the gear assembly is moved towards the static portion. The crane is also controlled, in conjunction with the tilt angle actuator 68, to adjust the height of the coupling arrangement 60 so as to maintain the tilt angle of the gear assembly at the desired level.

According to an alternative embodiment of the invention, the suspended portion of the gear assembly may be at least partially supported by the static portion of the gear assembly at certain times during the assembling/disassembling process. For example, the horizontal arm 46 may be caused to rest upon the guide assembly 50. This will cause the leading end of the suspended gear assembly to rise-up, thereby altering the tilt angle, as the support arm 42 is tilted about the coupling arrangement 60. In such situations, the tilt angle actuator 68, and the crane, may be controlled to regulate the tilting of the lifting tool 40 as described above.

Figure 6:
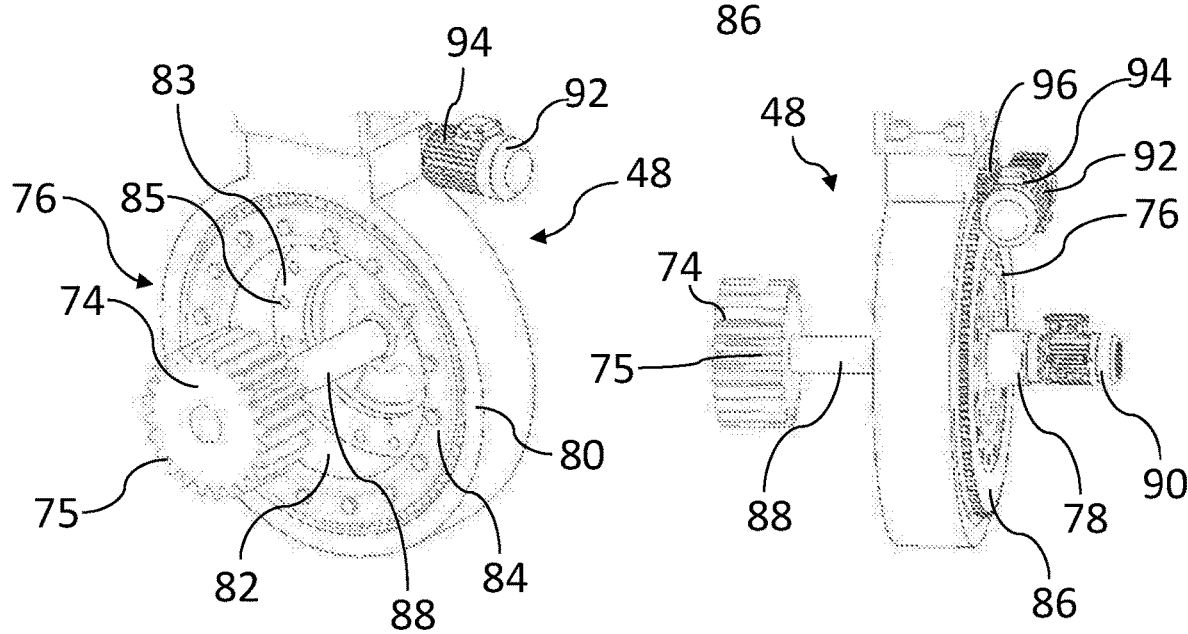
FIGS. 6(a) and 6(b) illustrate perspective views of the lifting tool engagement portion of FIG. 5.

Referring to FIGS. 5, 6(a) and 6(b), the engagement portion 48 of the lifting tool 40 includes a dummy sun gear 74—also referred to as a first helical gear engaging portion 74—for engaging with the planet gears 28 of the gear assembly 20, as will be explained in more detail below. A helix angle 75 of the dummy sun gear 74 is arranged to correspond to the helix angles 36 of the planet gears 28. Accordingly, the helix angle 75 has the same helix angle value as the helix angles 34, 36 of the ring and planet gears 24, 28. The helix angle 75 of the dummy sun gear has a helix angle direction which opposes the direction of the planet gear helix angle 36 and the ring gear helix angle 34.

The engagement portion 48 also includes a planet carrier engaging portion 76 for engaging with the planet carrier 30 of the first gear set 22, which in turn is coupled to the sun gear 32 of the second gear set. Accordingly, the planet carrier engaging portion 76 defines a third helical gear engaging portion 76 of the lifting tool 40.

The planet carrier engaging portion 76 includes a bearing assembly which is arranged to engage with the planet carrier 30 and cause rotation of the planet carrier 30 relative to the support frame 42 of the lifting tool 40. An outer ring 80 of the bearing assembly is defined by a cylindrical housing which is fixedly mounted to the lower end of the vertical arm 44 of the support frame 42. An inner ring 82 of the bearing assembly is rotatably mounted within the outer ring 80 and supported therein by a bearing which is provided between the inner and outer rings 82, 80. In this way, the inner and outer rings 82, 80 are arranged such that their respective axes are aligned with the rotational axis of the planet carrier 30 when the gear assembly 20 is attached to the lifting tool 40.

An inwardly facing end of the inner ring 82 defines a clamping plate 84 which is arranged to clamp a bearing set of the planet carrier engaging portion 76 between its inner and outer rings 82, 80. The inner ring 82 is further provided with an attachment ring 83 which is configured to engage with the planet carrier 30 when in use. The attachment ring 83 is arranged at the outwardly facing end of the inner ring 82, such that a portion of the planet carrier 30 is received at least partially through the inner ring 82 to engage with the attachment ring 83. The attachment ring 83 includes a plurality of attachment bolts (not shown) which are supported by a corresponding set of bolt holes 85 that are arranged around the circumference of the inner ring 82, and which are configured to couple the planet carrier 30 to the attachment ring 83.

A planet carrier rotation gear 86 is fixedly mounted to the outwardly facing end of the inner ring 82 so that it rotates, with the inner ring 82, relative to the support frame 42. A dummy sun gear actuator 78—also referred to as a second actuator 78—is attached to the planet carrier rotation gear 86 and is arranged to cause rotational movement of the dummy sun gear 74 about its axis, relative to the support frame 42. A dummy gear shaft 88 is coupled, at one end to a rotatable motor 90 of the dummy sun gear actuator 78, which is fixedly mounted at the axial centre of the rotation gear 86, on its outwardly facing surface. The planet carrier rotation gear 86 is machined directly onto the inner ring 82. Alternatively, the rotation gear 86 may be provided as a separate gear which may be fixedly attached to the inner ring 82.

The dummy sun gear shaft 88 extends from the dummy sun gear actuator 78, through the planet carrier rotation gear 86, and is then coupled at its opposite end to the dummy sun gear 74. The dummy sun gear shaft 88 is supported by a bearing arrangement of the rotation gear 86 so that the dummy sun gear 74 is rotatable with respect to the planet carrier engaging portion 76. The dummy sun gear shaft 88 is rotatably attached to an output shaft of the gearbox of the actuator 78, and is thereby arranged to be driven by the actuator 78 when in use.

With continuing reference to FIGS. 5, 6(a) and 6(b), the lifting tool 40 includes a planet carrier actuator 92—also referred to as a third actuator 92—which is arranged on the outer ring 80 of the planet carrier engaging portion 76, and is configured to cause rotational movement of the planet carrier 30 relative to the support frame 42. Similarly to the axial actuator 54, in the described example the planet carrier actuator 92 includes a rotatable motor 94 which is rotatably coupled by a driven gear 96 to the planet carrier rotation gear 86 such that rotation of the motor 94 causes rotational movement of the planet carrier rotation gear 86, which in turn causes the planet carrier 30 to move.

A particular advantage of the lifting tool 40 is that it enables each helical gear of the gear assembly 20 to be moved in an axial direction and a rotational direction, simultaneously, in order to engage or disengage the helical angles of the respective planet and ring gears 28, 24. During engagement or disengagement of the gear assembly 20, the axial actuator 54 is controllable to cause the axial movement of the support frame 42 and the planet gear 24 at an axial speed relative to the ring gear 28. At the same time, the dummy gear actuator 78 is configurable to rotate the dummy sun gear 74 to rotate the planet gears 28 at a planet gear rotational speed—also referred to as a first rotational speed. Accordingly, the rotational speed and the axial speed can be controlled to cause the respective axial and rotational movements to occur simultaneously to either engage or disengage the planet and ring gears 28, 24, in a smooth, fast and controlled manner.

In the above described example, the lifting tool 40 is arranged to cause simultaneous axial and rotational movement of the three planet gears 28 with respect to the ring gear 24, in order to engage or disengage the planet gears 28 with the rest of the gear assembly 20. However, it will be appreciated that the lifting tool 40 may be configured to cause the simultaneous axial and rotational movement of any number of the helical gears of the gear assembly 20. For example, in the above arrangement, the ring gear 24 remains static within the housing 26 of the gear assembly 20, whilst the planet gears 28 are movable with respect to the ring gear 24. In an alternative arrangement, the lifting tool 40 may be configured to cause the axial and rotational movement of the ring gear 24 relative to a plurality of static planet gears 28 that are mounted within the housing 26. Alternatively, the lifting tool 40 may be arranged to engage or disengage the sun gear 32 with respect to the planetary gears of the second gear set. In this way, the first and second helical gears according to the presently described invention, may define any two helical gears of the gear assembly 20 which are to be engaged or disengaged with one another.

Advantageously, the engaging portion 48 of the lifting tool 40 is further configured to allow the planet carrier 30 and the planet gears 28 to be rotated about their respective rotational axes, independently of each another. Accordingly, the planet gears 28 and the planet carrier 30 can be rotated at the required rotation speeds to enable the planet gears 28 of the first gear set 22 to engage with the ring gear 24, whilst simultaneously enabling the sun gear 32 to engage with the planet gears of the second gear set. Accordingly, the lifting tool 40 provides a smooth engagement and/or disengagement of two gear sets within the same gear assembly 20.

In order to achieve the above described coordination between the separate gear sets, the planet carrier actuator 92 is configurable to rotate the planet carrier 30 to rotate the sun gear 32 at a planet carrier rotational speed—also referred to as a second rotational speed. At the same time, the axial actuator 54 is controllable to cause the axial movement of the support frame 42 and the sun gear 32 (which is coupled to the planet carrier 30) at an axial speed relative to the planet gears of the second gear set. The axial speed of the sun gear 32 is the same as the axial speed of the planet gear 28 because the sun gear 32 and the planet gear 28 are arranged together as a single removable portion of the gear assembly 20, as shown in FIGS. 3(*a*) and 3(*b*). Accordingly, the rotational speeds of planet gears 28 and the sun gear 32 (i.e. the first and second rotational speeds) and the axial speed can be controlled, independently of each other, so as to provide a simultaneous engagement or disengagement of the gear assembly 20.

Figure 9:
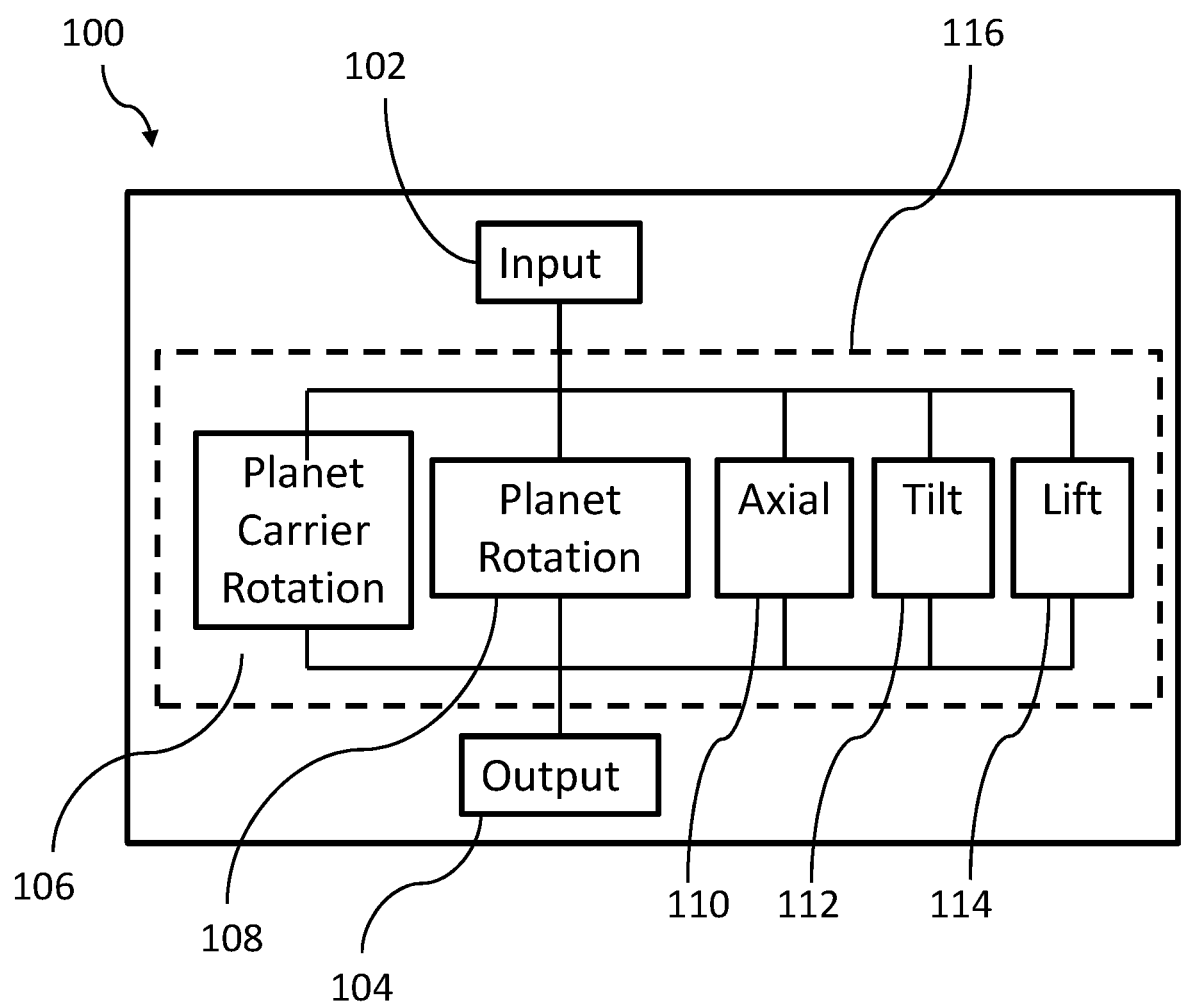
FIG. 9 illustrates a controller for controlling operation of the lifting tool of FIG. 2; and, FIG. 10 illustrates the steps of a method performed by the controller of FIG. 9.

The lifting tool 40 is connected to a controller 100—shown in FIG. 9—which is operable as a command and control interface between a user and the various actuators of the lifting tool 40. During operation of the lifting tool 40, the controller 100 is arranged to control the actuators according to a gear assembling or disassembling control strategy, as will be explained in more detail below.

The controller 100 is connected to a source of electrical power (not shown) and is thereby arranged to control the flow of electrical power to the actuators to control their operation. In particular, the controller is configured to control the speed at which each of the actuators operates. The controller 100 may also be arranged to control the operation of the crane to control the movement of the lifting tool 40 into position relative to the gear assembly 20.

The controller 100 includes an input 102 and an output 104 for receiving and transmitting, respectively, the inputs and outputs relating to the assembling and disassembling of the gear assembly 20. The controller 100 also includes a programmable logic controller (PLC), or processor 116, which is arranged to process the inputs, feedback signals and outputs, which are configured to operate the actuators of the lifting tool 40 according to a suitably prescribed control strategy.

The input 102 is arranged to receive data indicative of geometrical parameters of the gear assembly 20, which may include pitch diameter, tooth/groove width and helix angle that define the helix angles of the helical gears. The input data may additionally include data indicative of the mass of the gear assembly 20 being supported by the lifting tool 40. Alternatively, information regarding the geometrical parameters may be stored in a memory device of the controller 100 and accessible by the processor 116. The input 102 also receives data indicative of the operating parameters of the lifting tool 40, which may include the current operating state of each of the actuators 54, 68, 78, 92, e.g. the current operating speed of each actuator.

The operating parameter data relates to the axial and rotational positions of the helical gears of the gear assembly 20. For example, the operating parameter data may include a relative axial distance between two helical gears which are to be engaged or disengaged from each other, together with their respective rotational orientations.

The input 102 is also arranged to receive user commands relating to the assembling and/or dissembling of the gear assembly 20. For example, the user may input a command to initiate a control strategy directed towards assembling the gear assembly 20 at a desired speed and time. The input 102 is connected to a human machine interface (HMI) through which an operator of the lifting tool 40 is able to input the various physical and operating parameters relating to the gear assembly 20. The HMI can also receive user operating commands. Alternatively, each of the inputs may be preprogrammed into the controller 100. For example, the geometrical and operating parameters of may be stored as a lookup table, or series of lookup tables, on a computer-readable storage medium.

The processor 116 may include a number of determining modules, which are configured to determine control signals for controlling the actuators 54, 68, 78, 92, and optionally the lifting crane, in accordance with the prescribed control strategy. Each of the determining modules is arranged to calculate a control signal for controlling at least one of the actuators of the lifting tool 40 or the crane, in dependence on one or more of the received input parameters.

An axial movement module 110 is arranged to determine an axial control signal which corresponds to the axial speed of the planet gear 28 and/or the sun gear 32 of the gear assembly. Alternatively, the axial control signal may be determined in dependence on the desired axial speed of at least one of the planet gear 28 and the sun gear 32. The 'desired axial speed' represents a predetermined speed of the control method, which defines the speed at which the first and third helical gears 28, 32 will be translated. In this instance, the axial speed defines a target speed at which the controller 100 will control the axial actuator 54 to translate the lifting tool 42, relative to the second and fourth helical gears, respectively.

In alternative exemplary arrangements of the gear assembly 20, the first and third helical gears 28, 32 may be arranged such that they can be translated at different axial speeds. Accordingly, it will be appreciated that the axial speed of the first helical gear 28, with respect to the second helical gear 24, may be different to the axial speed of the third helical gear 32 with respect to the fourth helical gear.

A planet gear rotation module 108 is arranged to determine a planet gear rotational control signal which corresponds to the planet gear rotational speed, the planet gear rotational control signal being determined in dependence on the desired axial speed of the planet gear 28. The planet gear rotational control signal may also be determined in dependence on the rotational speed of the planet carrier 30 since the rotation of the planet carrier affects the position of the planet gears 28 that are supported therein.

A planet carrier rotation module 106 is arranged to determine a planet carrier rotational control signal, which corresponds to the rotational speed of the planet carrier 30 and the sun gear 32, the planet carrier rotational control signal being determined in dependence on the axial speed of the sun gear 32. The planet carrier rotational control signal may also be determined in dependence on the rotational speed of the planet gears 28 since the rotation of the planet carrier affects the position of the planet gears 28 that are supported by the planet carrier 30.

A tilt angle module 112 is arranged to determine a tilt angle control signal to cause adjustment of the tilt angle of the lifting tool 40 relative to the ring gear 24 prior to the axial and rotational movement of the planet gear 28. The tilt angle may be dynamically adjusted, or maintained, during the assembling/dissembling process to ensure that the rotational axis of the first helical gear 28 stays aligned with the axis of the second helical gear 24.

Furthermore, the function of the tilt angle module 112 is not only to adjust the tilt angle of the planet gear 28 relative to the ring gear 24, but it is also arranged to simultaneously adjust the tilt angle of the planet carrier 30. Accordingly, since the planet gears 28 and the sun gear 32 are linked together by the planet carrier 30 they will each share the same tilt angle, at least in the case that both the planet gears 28 and the sun gear 32 are installed at the same time when assembled together in as part of the same gear assembly 22.

A lifting module 114 is arranged to determine a lifting control signal to cause movement of the lifting tool 40 and the gear assembly 20 into position prior to the axial and rotational movement of the planet gear 28. During the assembly of the gear assembly 20, the lifting crane may be operated by the controller 100 to move the lifting tool into a starting position such that the guide assembly 50 can be connected to the supporting frame 42, in order for the axial actuator 54 to control the axial movement of the lifting tool 40 during the subsequent engagement procedure. Alternatively, the lifting crane may be operated manually by a crane operator, or a dedicated crane controller.

Following the determination of the control signals by the determining module, the output 104 is arranged to transmit each of the control signals to the motor of each respective actuator in order to control the operation of the lifting tool 40. Each of the determined control signals includes a position, timing and speed component so as to control the starting position, the starting time and also the operating speed of the respective actuator motors. To achieve this, the outputted control signals are configured to comprise suitable current/voltage parameters, as would be readily understood by the skilled person.

Figure 10:
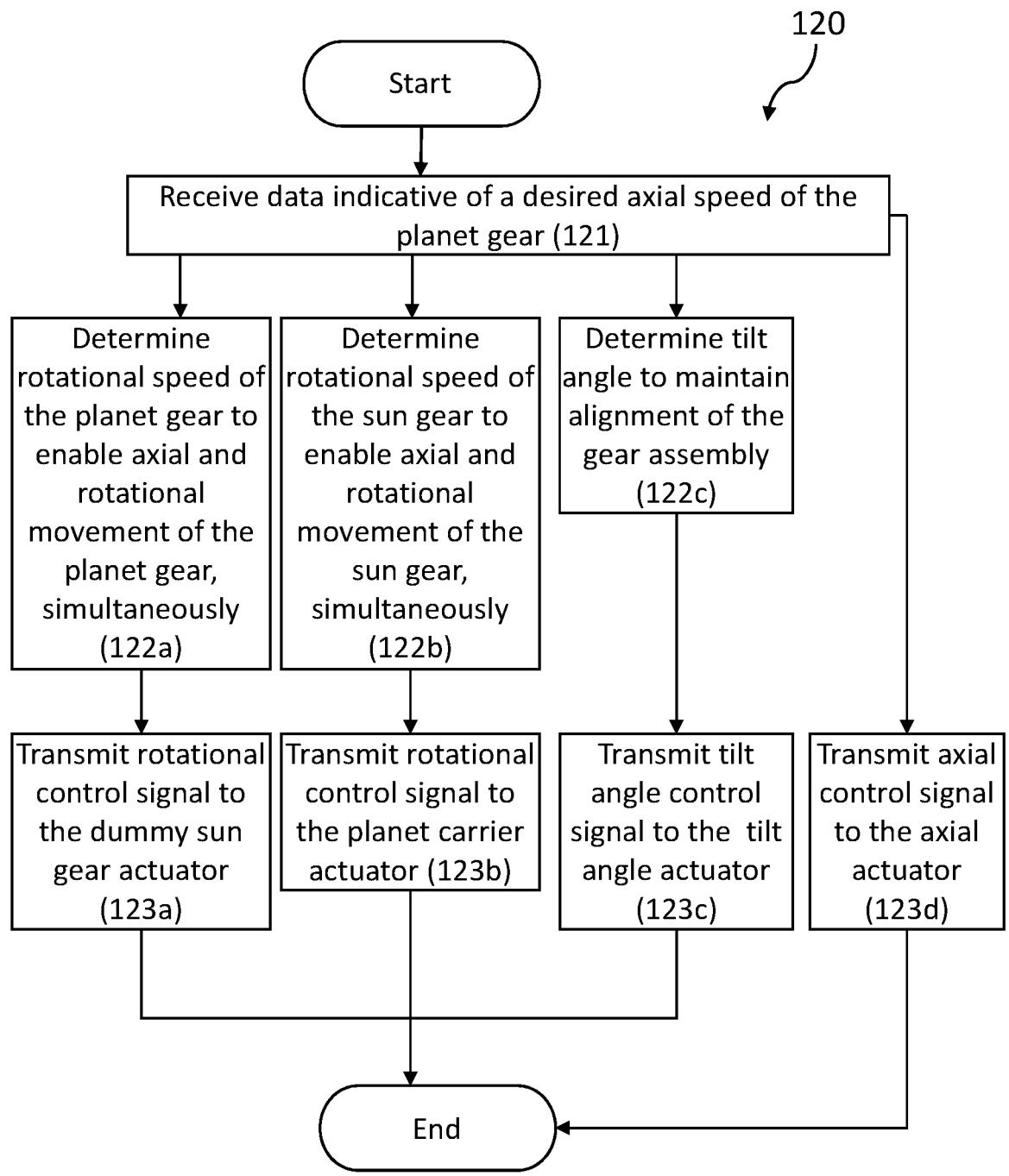

An exemplary control strategy 120, as executed by the controller 100, will now be described with reference to FIG. 10. The control strategy 120 is primarily directed towards controlling the lifting tool 40 to assemble or dissemble the gear assembly 20.

The control strategy 120 commences, with a first step 121, in which the controller 100 receives a signal indicative of a demand for the gear assembly 20 to be assembled or dissembled at a desired axial speed. The desired axial speed corresponds to the relative axial movement of the planet gear 28 relative to the ring gear 24 with which it is to be engaged or disengaged.

In a second step 122a, the controller 100 determines a rotational speed of the planet gear 28 (i.e. the first rotational speed) which will enable the planet gear 28 to be engaged or disengaged with the ring gear 24, at the desired axial speed. At the same time, in step 122b, the controller 100 determines a rotational speed of the planet carrier 30 (i.e. the second rotational speed) which will enable the sun gear 32 to engage or disengage with the planet gears of the second gear set, at the desired axial speed.

The determined rotational speeds are each calculated based on the desired axial speed and also the pre-defined set of geometrical parameters of the gear assembly 20. In addition, at step 122c, the controller 100 also determines a configuration of the coupling arrangement 60 which will ensure that the tilt angle of the supporting frame 42 and the gear assembly 20 remains sufficiently aligned in order to allow the engagement or disengagement to occur.

In a third step 123a, a rotational control signal is transmitted to the dummy sun gear actuator 78 to cause the rotation of the planet gear 28 at the first rotational speed. At the same time, in step 123b, a planet carrier rotational control signal is transmitted to the planet carrier actuator 92 to cause rotational movement of the planet carrier 30 and the sun gear 32 at the second rotational speed. In addition, a tilt angle control signal is transmitted to the tilt angle actuator 68 to adjust the position of the adjustable yoke, relative to the support frame 42. At the same time, in step 123d, an axial control signal is transmitted to the axial actuator 54 to cause the axial movement of the planet and sun gears 28, 32 at the desired axial speed. The combination of these control signals results in the simultaneous axial and rotational movement of the planet gear 28, relative to the sun gear 24, resulting in the required assembly or disassembly of the gear assembly 20.

By determining the axial and rotational control signals in dependence on the same desired axial speed, the controller 100 is able to control the lifting tool 42 to assemble or disassemble the gear assembly, simultaneously, whilst at the same time preventing damage to the helical features of the gears.

Many modifications may be made to the above-described examples without departing from the scope of the appended claims. For example, according to an alternative control method, the axial and rotational movement of each of the helical gears is controlled in dependence on a desired rotational speed of one of the first and third helical gears. In such exemplary arrangements, the controller 100 is configured to receive a desired rotational speed corresponding to at least one of the first and third helical gears 28, 32. In this way, the received rotational speed value defines the determined speed of the control method. The controller 100 is then arranged to determine the required corresponding axial and rotational control signals based on the predetermined speed.

In situations where only one set of helical gears are to be engaged, or disengaged, with one another, then only the rotational actuator corresponding to that set of helical gears will be controlled by the controller 100.

Each of the actuator motors 56, 70, 90, 94 is a step motor, for example, a brushless DC electric motor that divides a full rotation into a number of equal steps. Furthermore, each of the controller modules 106, 108, 110, 112, 114 is provided as algorithmic instances on a processor 116 of the controller 100. The processor 116 is arranged to carry out the functions of each module in response to a suitable demand or instruction. Alternatively, each of the controller's modules 106, 108, 110, 112, 114 may be provided with any number of separate physical processing units, as would be readily understood by the skilled person.

It will also be appreciated that suitable connection apparatus may be provided to interconnect the controller 100 and the various actuators of the lifting tool 40. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

FEATURE LIST

Wind turbine 10
Tower 12
Nacelle 14
Rotor hub 16
Rotor blades 18
Gear assembly 20
First gear set 22
Ring gear 24
Housing 26
Planet gears 28
Planet carrier 30
Sun gear 32
Ring gear helix angle 34
Planet gear helix angle 36
Sun gear helix angle 38
Lifting tool 40
Support frame 42
Vertical arm 44
Horizontal arm 46
Engagement portion 48
Guide assembly 50
Guide component 52
Axial actuator 54
Axial actuator rotatable motor 56
Axial actuator rod 58
Coupling arrangement 60
Coupling ring 62
Adjustable yoke 64
Horizontal arm slot 66
Tilt angle actuator 68
Tilt angle actuator rotatable motor 70
Tilt angle actuator rod 72
Dummy sun gear 74
Planet carrier engaging portion 76
Dummy sun gear actuator 78
Outer ring 80
Inner ring 82
Attachment ring 83
Clamping plate 84
Bolt holes 85
Planet carrier rotation gear 86
Dummy sun gear shaft 88
Dummy sun gear actuator rotatable motor 90
Planet carrier actuator 92
Planet carrier actuator rotatable motor 94
Driven gear 96
Controller 100
Input 102
Output 104
Planet carrier rotation module 106
Planet gear rotation module 108
Axial module 110
Tilt module 112
Lift module 114
Processor 116
Control strategy 120

The invention claimed is:

1. A method of assembling or disassembling a gear assembly of a wind turbine, the gear assembly comprising a first helical gear and a second helical gear configured for rotatable engagement with the first helical gear, the method comprising transmitting a control signal to cause:
   axial movement of the first helical gear at an axial speed relative to the second helical gear along a rotational axis of the first helical gear; and,
   rotational movement of the first helical gear at a first rotation speed relative to the second helical gear about the rotational axis of the first helical gear,
   wherein one of the axial speed and the first rotation speed is a predetermined speed, and the other of the axial speed and first rotation speed is determined in dependence on the predetermined speed, and
   wherein the control signal causes the axial and rotational movement of the first helical gear to occur simultaneously to engage or disengage the first and second helical gears.

2. The method according to claim 1, wherein the control signal is transmitted to first and second actuators configured to cause the respective axial and rotational movement of the first helical gear in dependence on the control signal.

3. The method according to claim 1, wherein the first rotation speed is determined in dependence on a geometrical parameter of the first and/or second helical gears.

4. The method according to claim 3, wherein the geometrical parameter comprises at least one of: a tooth width; a helix angle; a tilt angle; and, a pitch diameter.

5. The method according to claim 1, wherein the control signal causes the axial and rotational movements of the first helical gear to commence at substantially the same time.

6. The method according to claim 1, the method comprising:
   providing a lifting tool arranged to engage with the gear assembly and to be controlled to cause the axial and rotational movement of the first helical gear; and,
   transmitting a control signal to cause adjustment of a tilt angle of the lifting tool relative to the second helical gear prior to the axial and rotational movement of the first helical gear.

7. The method according to claim 1, the method comprising, when assembling the gear assembly, aligning a groove of the first helical gear with a tooth of the second helical gear prior to the axial and rotational movement of the first helical gear relative to the second helical gear.

8. The method according to claim 1, the gear assembly comprising a third helical gear and a fourth helical gear configured for rotatable engagement with the third helical gear, wherein the method comprises transmitting the control signal to cause:

axial movement of the third helical gear at an axial speed relative to the fourth helical gear along a rotational axis of the third helical gear; and, rotational movement of the third helical gear at a third rotation speed relative to the fourth helical gear about a rotational axis of the third helical gear, the third rotation speed being determined in dependence on the predetermined speed, and the third rotation speed being different from the first rotation speed, wherein the control signal causes the axial and rotational movement of the third helical gear to occur simultaneously with the axial and rotational movement of the first helical gear to engage or disengage the third and fourth helical gears.

9. The method according to claim 8, the gear assembly comprising a planet carrier supporting the first helical gear and being coupled to the third helical gear, wherein the method comprises transmitting the control signal to cause rotational movement of the planet carrier to cause the rotational movement of the third helical gear about its rotational axis.

10. A controller for assembling or disassembling a gear assembly of a wind turbine, the gear assembly comprising a first helical gear and a second helical gear configured for rotatable engagement with the first helical gear, the controller being configured to:

receive data indicative of one of an axial speed of the first helical gear relative to the second helical gear along a rotational axis of the first helical gear and a first rotation speed of the first helical gear relative to the second helical gear;

determine the other of the axial speed and the first rotation speed in dependence on the received data; and, transmit a control signal to cause axial movement of the first helical gear at the axial speed along a rotational axis of the first helical gear, and to cause rotational movement of the first helical gear at the first rotation speed relative to the second helical gear about the rotational axis of the first helical gear, wherein the control signal is configured to cause the axial and rotational movement of the first helical gear to occur simultaneously to engage or disengage the first and second helical gears.

11. A lifting tool for assembling or disassembling a gear assembly of a wind turbine, the gear assembly comprising a first helical gear and a second helical gear configured for rotatable engagement with the first helical gear, the lifting tool comprising:

a support frame having a support frame and engagement means configured for engagement with the gear assembly;

a guide assembly arranged to be mounted to a housing of the gear assembly and for engagement with the support frame;

a first actuator arranged to cause axial movement of the support frame guided by the guide assembly; and a second actuator arranged to cause rotational movement of the engagement means relative to the support frame;

wherein, when the engagement means is in engagement with the gear assembly, the first actuator is controllable to cause the axial movement of the support frame and the first helical gear at an axial speed relative to the second helical gear along a rotational axis of the first helical gear and the second actuator is controllable to cause the rotational movement of the engagement means and the first helical gear at a first rotation speed relative to the second helical gear about the rotational axis of the first helical gear, wherein one of the axial speed and the first rotation speed is a predetermined speed and the other of the axial speed and first rotation speed is determined in dependence on the predetermined speed, and wherein the first and second actuators are controllable to cause the respective axial and rotational movements to occur simultaneously to engage or disengage the first and second helical gears.

12. The lifting tool according to claim 11, the gear assembly comprising a third helical gear and a fourth helical gear configured for rotatable engagement with the third helical gear, wherein:

the engagement means comprises a first helical gear engaging portion arranged to engage with the first helical gear, and a third helical gear engaging portion arranged to engage with the third helical gear, the second actuator being arranged to cause rotational movement of the first helical gear engaging portion, and the lifting tool comprising a third actuator arranged to cause rotational movement of the third helical gear engaging portion;

wherein the third actuator is controllable to cause the rotational movement of the third helical gear at a third rotation speed relative to the fourth helical gear about a rotational axis of the third helical gear, the third rotation speed being determined in dependence on the predetermined speed, and wherein the third actuator is controllable to operate simultaneously with at least one of the first and second actuators to engage or disengage the third and fourth helical gears.

13. The lifting tool according to claim 12, wherein the first helical gear is a planet gear of a first gear set of the gear assembly, the second helical gear is a ring gear of the first gear set, the third helical gear is a sun gear of a second gear set of the gear assembly, and the fourth helical gear is a planet gear of the second gear set, the gear assembly comprising a planet carrier supporting the planet gear of the first gear set and being coupled to the sun gear of the second gear set;

wherein the first helical gear engaging portion comprises a dummy sun gear arranged to engage with the planet gear of the first gear set, and the third helical gear engaging portion is configured to rotatably engage the planet carrier to cause the rotational movement of the sun gear of the second gear set.

14. The lifting tool according to claim 11, the lifting tool comprising coupling means attached to the support frame for coupling the lifting tool to a crane for moving the lifting tool into position, wherein the coupling means comprises an attachment member arranged for attachment to the support frame and arranged to allow movement of the support frame relative to the coupling means, and the lifting tool comprising a fourth actuator arranged to cause movement of the support frame relative to the coupling means along a longitudinal axis of the support frame to adjust a tilt angle of the lifting tool.

15. A wind turbine arrangement, comprising:

a wind turbine including a gear assembly having a first helical gear and a second helical gear configured for rotatable engagement with the first helical gear;

a lifting tool according to claim 11 for assembling or disassembling the gear assembly; and, a crane for moving the lifting tool into position relative to the gear assembly.

\* \* \* \* \*